(12) United States Patent
Enomoto et al.

(10) Patent No.: US 9,094,563 B2
(45) Date of Patent: Jul. 28, 2015

(54) DOCUMENT READER

(75) Inventors: Shinnosuke Enomoto, Minami-Alps (JP); Junya Ozawa, Chuo (JP)

(73) Assignee: NISCA CORPORATION, Minamikoma-Gun, Yamanashi (JP)

( * ) Notice: Subject to any disclaimer, the term of this patent is extended or adjusted under 35 U.S.C. 154(b) by 0 days.

(21) Appl. No.: 14/343,281

(22) PCT Filed: Aug. 31, 2012

(86) PCT No.: PCT/JP2012/072105
§ 371 (c)(1),
(2), (4) Date: Mar. 6, 2014

(87) PCT Pub. No.: WO2013/035631
PCT Pub. Date: Mar. 14, 2013

(65) Prior Publication Data
US 2014/0226191 A1 Aug. 14, 2014

(30) Foreign Application Priority Data
Sep. 7, 2011 (JP) ................................. 2011-195264
Sep. 9, 2011 (JP) ................................. 2011-196800

(51) Int. Cl.
*H04N 1/04* (2006.01)
*H04N 1/03* (2006.01)
(Continued)

(52) U.S. Cl.
CPC ........... *H04N 1/0303* (2013.01); *H04N 1/0062* (2013.01); *H04N 1/00588* (2013.01);
(Continued)

(58) Field of Classification Search
CPC .............. H04N 1/02815; H04N 1/193; H04N 1/40056; H04N 2201/02868; H04N 1/1013; H04N 3/1581; H04N 1/031; H04N 2201/03138; H04N 1/484; H04N 1/12; H01L 27/14665

USPC ......... 358/498, 496, 484, 475, 482, 483, 474, 358/509, 505; 250/208.1, 239, 234–236, 250/216, 227.11; 399/211, 220, 221; 355/67, 70
See application file for complete search history.

(56) References Cited

U.S. PATENT DOCUMENTS

2006/0061839 A1 3/2006 Hiraoka et al.
2006/0082842 A1* 4/2006 Hiraoka et al. ............... 358/498
(Continued)

FOREIGN PATENT DOCUMENTS

JP   S62-183258 A   8/1987
JP   H07-023180 A   1/1995
(Continued)

OTHER PUBLICATIONS

PCT/ISA/210, "International Search Report for PCT/JP2012/072105".
(Continued)

*Primary Examiner* — Martin Mushambo
(74) *Attorney, Agent, or Firm* — Manabu Kanesaka

(57) ABSTRACT

A reading unit (3) placed on the inner side of a U-shaped feed path (12) that feeds a document is formed such that the height-axis dimension of said reading unit decreases in a direction extending toward a side having a paper delivery tray (11). Contact glass (20), a light source and a first mirror (24) are placed in the reading unit (3) at an end portion of the side having the paper delivery tray (11). Multiple reflecting mirrors (25, 26 and 27), a lens (28) and a photoelectric converter element (29) are placed further from the paper delivery tray than the first mirror (24) in the reading unit. This structure enables the reading unit provided in a document feeder to be more compact while ensuring the required light path length, and enables the entire document feeder to be more compact.

16 Claims, 12 Drawing Sheets

(51) Int. Cl.
*H04N 1/00* (2006.01)
*H04N 1/028* (2006.01)
*H04N 1/12* (2006.01)
*H04N 1/10* (2006.01)

(52) U.S. Cl.
CPC ....... *H04N1/00591* (2013.01); *H04N 1/00602* (2013.01); *H04N 1/00615* (2013.01); *H04N 1/00631* (2013.01); *H04N 1/02845* (2013.01); *H04N 1/0305* (2013.01); *H04N 1/1235* (2013.01); *H04N 1/103* (2013.01); *H04N 1/1017* (2013.01)

(56) References Cited

U.S. PATENT DOCUMENTS

| | | |
|---|---|---|
| 2006/0203307 A1 | 9/2006 | Morimoto |
| 2007/0223061 A1 | 9/2007 | Tanaka et al. |
| 2008/0117470 A1 | 5/2008 | Suga |
| 2009/0219586 A1 | 9/2009 | Fujimoto et al. |

FOREIGN PATENT DOCUMENTS

| | | |
|---|---|---|
| JP | H07-193680 A | 7/1995 |
| JP | H11-205536 A | 7/1999 |
| JP | 2000-321682 A | 11/2000 |
| JP | 2001-255601 A | 9/2001 |
| JP | 2004-364180 A | 12/2004 |
| JP | 2007-013625 A | 1/2007 |
| JP | 2009-164764 A | 7/2009 |
| JP | 2009-182399 A | 8/2009 |
| JP | 2010-028216 A | 2/2010 |

OTHER PUBLICATIONS

PCT/ISA/237, "International Written Opinion for PCT/JP2012/072105".

* cited by examiner

DOCUMENT READER

RELATED APPLICATIONS

The present application is National Phase of International Application No. PCT/JP2012/072105 filed Aug. 31, 2012, and claims priority from Japanese Applications No. 2011-195264, filed Sep. 7, 2011 and No. 2011-196800, filed Sep. 9, 2011.

TECHNICAL FIELD

The present invention relates to a document reader that reads both sides of a document, and particularly to a document reader equipped with a document conveyance device having a reading unit that reads the other side of a document whose one side has been read.

BACKGROUND ART

Conventionally, what is known as a document reader that reads both sides of a document where images are formed on the two sides is: a device that includes a document conveyance device having a reversing mechanism that turns a document upside down, and which conveys a document to a reading unit and thereby reads one side of the document and then turns over the document by using the reversing mechanism and conveys again the document to the reading unit to read the other side of the document; and a device that includes a first reading unit for reading one side of a document and a second reading unit for reading the other side of the document, and which reads the document by using the first and second reading units.

The latter document reader are disclosed in Patent Documents 1, 2, and 3, for example. In the case of this device, in a main body of the document reader, a first reading unit of a reduction optical system is provided; in a document conveyance device that is so provided as to be freely opened and closed in the main body of the document reader, a second reading unit of the reduction optical system is provided. The second reading unit provided in the document conveyance device is disposed on a downstream side of the first reading unit, and is provided on an inner side of a document conveyance path that is formed into a U-shape.

Both the first and second reading units include a light source that emits light to a document via a contact glass surface; a plurality of mirrors that guide the light reflected from the document to a predetermined direction; a lens that converges the reflected light which is guided by a plurality of the mirrors where the light is reflected a plurality of times; and a photoelectric conversion element (COD) that carries out photoelectric conversion of the light converged by the lens. The light that is emitted from the light source to the surface of the document is reflected by a plurality of mirrors, and is read by the photoelectric conversion element via the lens. Image information of the document that is read by the photoelectric conversion element is transmitted as electric signals to an image processing unit. After image processing is performed, the signals are output.

PRIOR ART DOCUMENTS

Patent Documents

[Patent Document 1] Japanese Patent Application Laid-Open Publication No. 2006-253914

[Patent Document 2] Japanese Patent Application Laid-Open Publication No. 2007-13625

[Patent Document 3] Japanese Patent Application Laid-Open Publication No. 2009-164764

SUMMARY OF THE INVENTION

Problems to be Solved by the Invention

The document conveyance device includes not only a mechanism for conveying a document but also the above-described second reading unit of the reduction optical system that uses a plurality of mirrors to reflect the light a plurality of times. Therefore, the problem is that the device becomes larger in size. Therefore, it has long been hoped that the reading unit and the document conveyance device will be made smaller in size.

In recent years, as a means for making the reading unit smaller in size, one idea is to make as short as possible the length of an optical path extending from the document to the photoelectric conversion element by employing a wide-angle lens, thereby making the reading unit smaller in size. However, if the wide-angle lens is employed, the amount of light coming in at an angle with respect to an optical axis of the lens is reduced compared with the amount of light coming in parallel to the optical axis. Accordingly, the amount of light from the light source needs to be increased. Another problem is that aberration of the lens increases, making it impossible to correctly read an image in the photoelectric conversion element for the image of the document. Therefore, the idea is not an effective solution to the problem.

The present invention has been made in view of the above problems. The object of the invention is to provide an image reading device equipped with a document conveyance device that is able to decrease the size of the reading unit provided in the document conveyance device while ensuring a required length of an optical path, and to make the entire document conveyance device smaller in size.

Means for Solving the Problems

To solve the above problems, a document reader of the present invention includes: a paper feed tray on which a document is placed; a paper discharge tray that is disposed below the paper feed tray; a U-shaped conveyance path that guides a document fed from the paper feed tray to the paper discharge tray; and reading means for reading a document passing over a predetermine reading position of the conveyance path, wherein the reading means includes a reading unit having a contact glass which includes the reading position, a light source which emits light to a document via a surface of the contact glass, a first mirror which reflects the light reflected from the document, a plurality of mirrors which reflect the light reflected by the first mirror a plurality of times, a lens that converges the light that is reflected a plurality of times by the plurality of mirrors, and a photoelectric conversion element which carries out photoelectric conversion of the light converged by the lens, the reading unit is placed on an inner side of the U-shaped conveyance path, and becomes shorter in height-direction length toward the paper discharge tray, and in an end portion of the reading unit that is short in height-direction length on the paper discharge tray's side, the contact glass, the light source, and the first mirror are placed, and on a side that is further away from the paper discharge tray than the first mirror in the reading unit, the plurality of mirrors, the lens, and the photoelectric conversion element are placed.

Advantages of the Invention

According to the above configuration, the document conveyance path is formed into a U-shape. The outer shape of the reading unit is so formed as to become narrower in height-direction length toward the paper discharge tray, and the reading unit is placed inside the U-shaped conveyance path. Therefore, the device is smaller in size as a whole.

EMBODIMENTS FOR CARRYING OUT THE INVENTION

Figure 1:
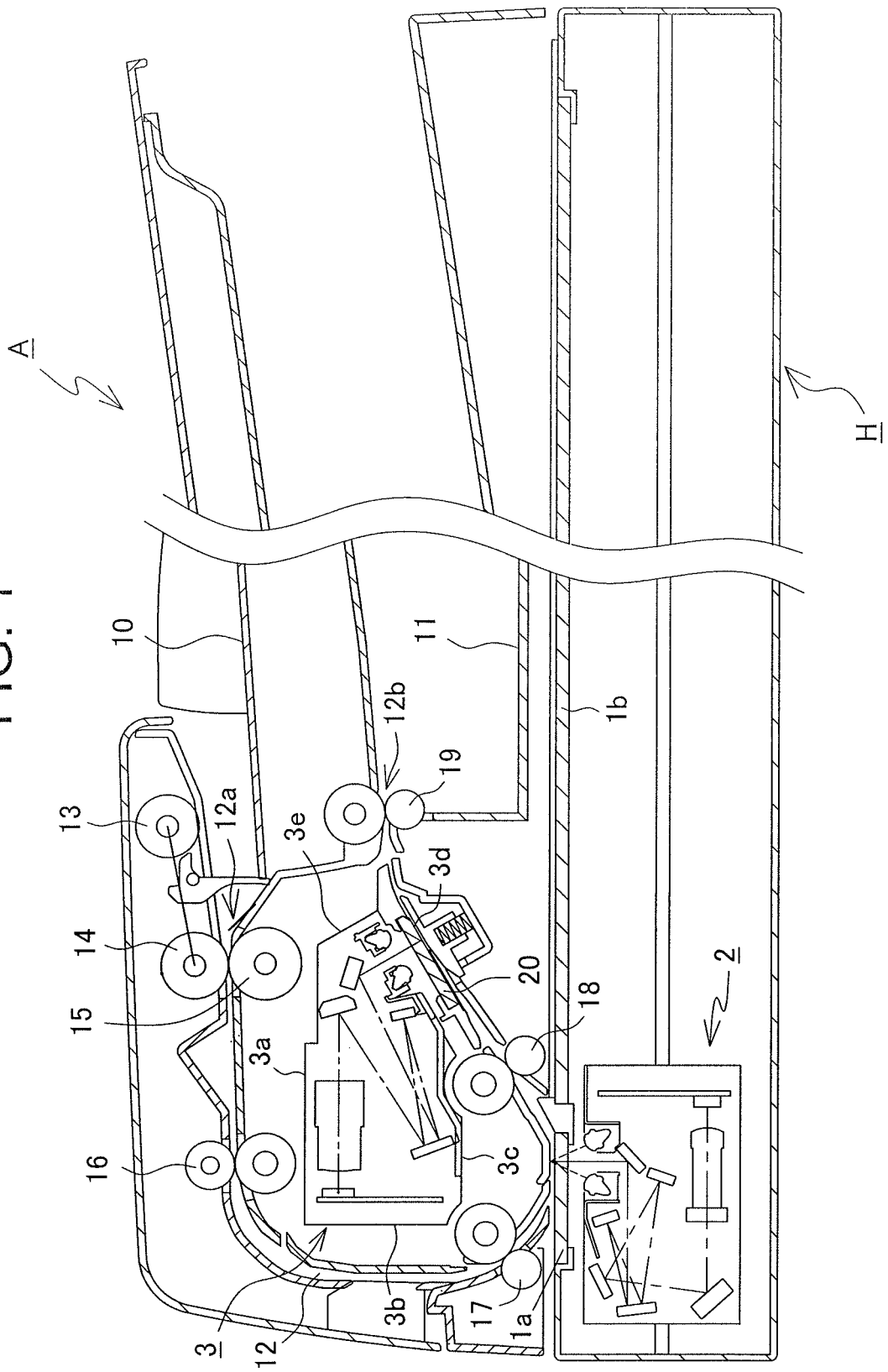
FIG. 1 is a cross-sectional view showing the overall configuration of a document reader main body and a document conveyance device according to the present invention.

Hereinafter, a document reader equipped with a document conveyance device of the present invention will be described. FIG. 1 is a cross-sectional view showing the overall configuration of a document reader main body and a document conveyance device.

As shown in FIG. 1, the document reader includes a document reader main body H and a document conveyance device A, which conveys a document. The document conveyance device A is attached to the document reader main body H via a hinge, which is not shown. Incidentally, the hinge supports the document conveyance device A in such a way that the document conveyance device A can be freely opened and closed with respect to an upper surface of the document reader main body H.

In the document reader main body H, a first reading unit 2 is provided to read one side of a document that is conveyed by the document conveyance device A on an upper surface of a contact glass 1a. In the document conveyance device A, a second reading unit 3 (reading unit) is provided to read the other side of the document that passes over the upper surface of the contact glass 1a of the document reader main body H.

The document conveyance device A is mounted on the main body H in such a way as to be freely opened and closed, thereby exposing an upper surface of the document reader main body H. The document conveyance device A is so formed as to move the first reading unit 2 to read a document placed on a contact glass 1b of the main body H.

The first reading unit 2 provided in the document reader main body H is a unit that is formed integrally with a photoelectric conversion means containing a light source, a plurality of mirrors, a lens, and a photoelectric conversion element (CCD). The first reading unit 2 reads an image on a document by directing light from the light source to a conveyed document via the first contact glass 1a, and using mirrors to reflect the reflected light, and using the photoelectric conversion means containing CCD to carry out photoelectric conversion via the lens. The first reading unit 2 moves in a sub-scanning direction to read an image on a thick document, such as book, which is placed on the contact glass 1b as the document conveyance device A is opened and closed.

As shown in FIG. 1, the document conveyance device A includes a paper feed tray 10, on which a plurality of documents can be placed; and a paper discharge tray 11, in which documents that have been read are stored. The paper feed tray 10 is placed above the paper discharge tray 11. A U-shaped document conveyance path 12 is so provided as to extend from the paper feed tray 10 to the paper discharge tray 11.

The document conveyance device A includes a supply roller 13, which comes in contact with a document to supply the document; a paper feed roller 14, which feeds the supplied document; a separation roller 15, which is pressed against the paper feed roller 14 to separate one document; a pair of resistance rollers 16, which hit the tip of one document that has been separated and fed to match and then send the document to a downstream side; a pair of first conveyance rollers 17, which are disposed on an upstream side of the first contact glass 1a; a pair of second conveyance rollers 18, which are disposed on a downstream side of the first contact glass 1a; and a pair of paper discharge rollers 19, which are disposed on a downstream side of the pair of second conveyance rollers 18 and which discharge the document onto the paper discharge tray 11.

In the document conveyance device A, a second reading unit 3 is provided to read a document surface that is opposite to a document surface read by the first reading unit 2. The second reading unit 3 is disposed in a space that becomes gradually narrower toward a paper discharge direction of an inner side of the U-shaped document conveyance path 12. In the second reading unit 3, a third contact glass 20 is provided in an end portion of the paper discharge direction thereof. The third contact glass 20 is placed between the pair of second conveyance rollers 18 and the pair of paper discharge rollers 19, and functions as part of a guide of the document conveyance path. The third contact glass 20 is so formed that a document passing over a surface of the third contact glass 20 is read by the second reading unit 3.

In the above configuration, the supply roller 13 supplies documents on the paper feed tray 10, and the paper feed roller 14 and the separation roller 15 separate one out of the documents. The one separated document is matched by the pair of resistance rollers 16, and is then conveyed by the pair of first conveyance rollers 17 to the first contact glass 1a. Then, the document that has passed over the first contact glass 1a is carried by the pair of second conveyance rollers 18 to the third contact glass 20, before being discharged onto the paper discharge tray 11 by the pair of paper discharge rollers 19. In the process of conveying the document, when the document passes over the first contact glass 1a, the front surface of the document is read by the first reading unit 2. When the document passes over the third contact glass 20, the back surface of the document is read by the second reading unit 3.

Figure 2:
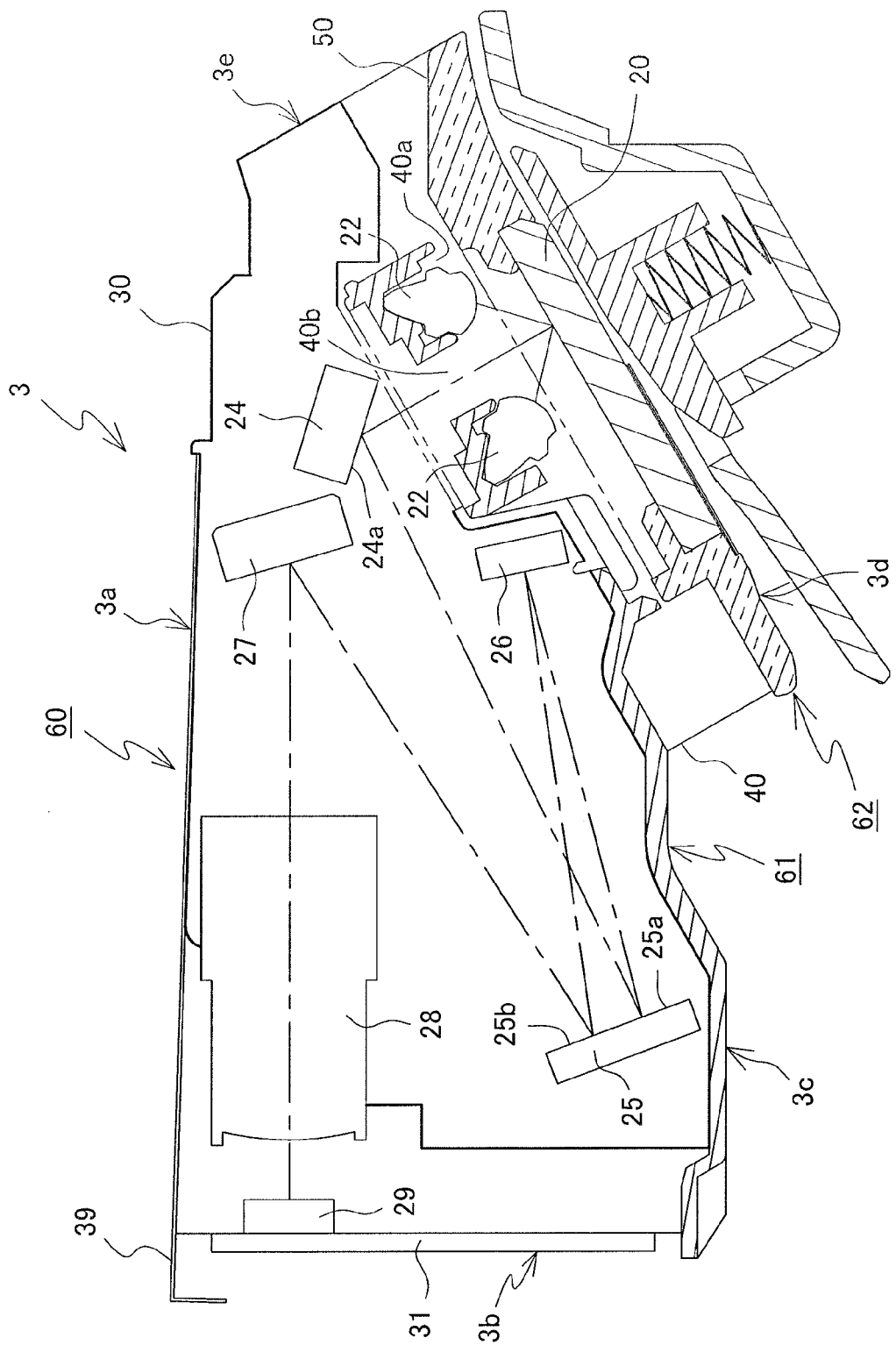
FIG. 2 is an enlarged cross-sectional view showing a second reading unit according to the present invention.

Then, the second reading unit 3 will be described in detail. FIG. 2 is an enlarged cross-sectional view showing the second reading unit 3. The second reading unit 3 includes a light source, which is made up of a LED 21 and light guide bodies 22 that are designed to emit the light to a document conveyed on the third contact glass 20; a plurality of mirrors 24, 25, 26, and 27, which guide the light reflected from the document to a predetermined direction; a lens 28, which converges the reflected light guided by a plurality of the mirrors 24, 25, 26, and 27; and a CCD (photoelectric conversion element) 29, which carries out photoelectric conversion of the light converged by the lens 28.

The light that is emitted from the light source via the third contact glass 20 is directed at the document. The light reflected therefrom is reflected by a plurality of the mirrors 24, 25, 26, and 27. Then, photoelectric conversion is performed by the CCD 29 via the lens 28 to read an image on the document.

In that manner, in the above document conveyance device A, an image on the front surface of the document passing over the first contact glass 1a is read by the first reading unit 2, and an image on the back surface of the document passing over the third contact glass 20 is read by the second reading unit 3. Therefore, it is possible to greatly reduce the time required to read images on both sides of the document.

Figure 12:
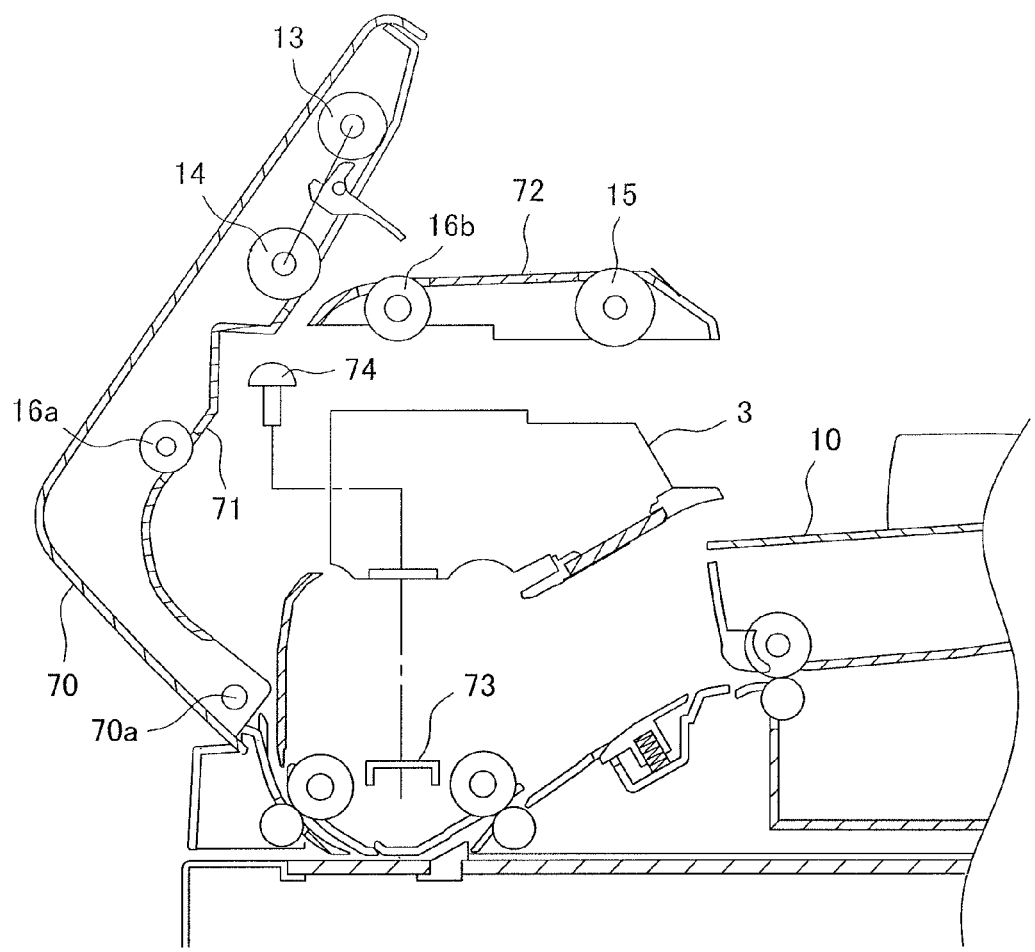
FIG. 12 is a schematic diagram showing a detaching state of the second reading unit according to the present invention.

The second reading unit 3 is mounted on the document conveyance device A in a detachable manner to allow maintenance. FIG. 12 is a schematic diagram showing a detaching state of the second reading unit 3. A screw 74 is used to mount the second reading unit 3 on a support piece 73 that is provided in the document conveyance device A.

When maintenance of the second reading unit 3 is carried out, as shown in FIG. 12, a device cover 70 is rotated in an anticlockwise direction in the diagram around a shaft 70a that is provided on a downstream side of an upper guide 71, one portion of which is formed on an upstream side of the document conveyance path 12: On the device cover 70, the supply roller 13, the paper feed roller 14, the resistance drive roller 16a, and the upper guide 71 are mounted. Then, a lower guide 72, one portion of which is formed on an upstream side of the document conveyance path 12, is detached: On the lower guide 72, the separation roller 15, and the resistance driven roller 16b are mounted. As a result, the second reading unit 3 is exposed. The screw 74 connecting the second reading unit 3 to the support piece 73 is loosened, and the second reading unit 3 is detached from a conveyance mechanism section of the document conveyance device A.

After the maintenance is complete, the second reading unit 3 is mounted again on the support piece 73 with the screw 74, and then the lower guide 72 is attached. After this, the device cover 70 is rotated in a clockwise direction in the diagram, thereby returning the document conveyance device A to the previous state in which the second reading unit 3 is not yet detached.

Figure 3:
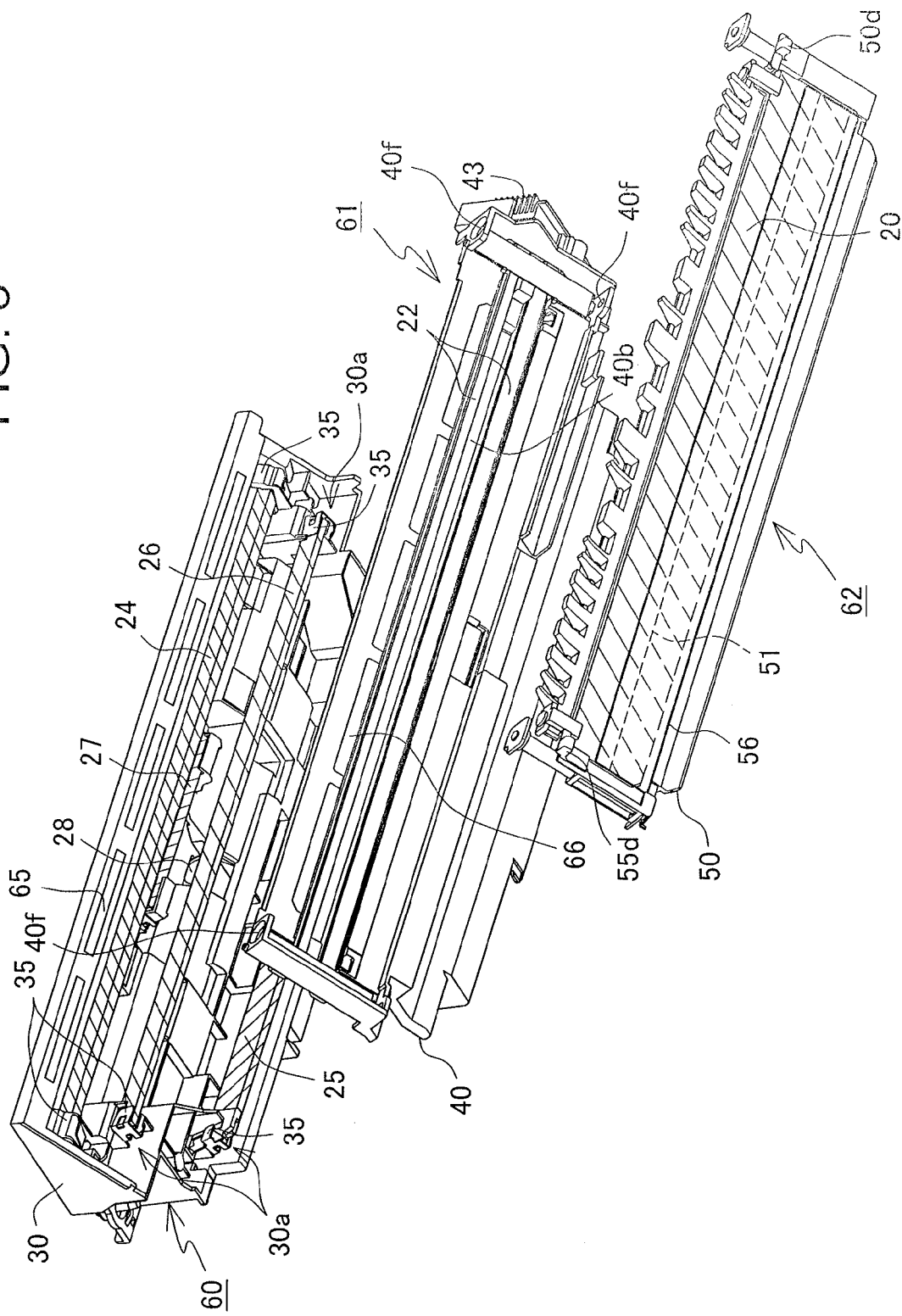
FIG. 3 is an exploded perspective view showing the configuration of the second reading unit according to the present invention.

The second reading unit 3 will be described in detail. FIG. 3 is an exploded perspective view of the second reading unit 3, showing each unit. As shown in FIGS. 3 and 2, the second reading unit 3 includes an optical unit 60 (third unit), in which the four mirrors 24, 25, 26, and 27, the lens 28, and the CCD 29 are provided; a light source unit 61 (second unit), in which the LED 21 and the light guide bodies 22 are provided; and a glass unit 62 (first unit), in which the third contact glass 20 is provided.

The optical unit 60, the light source unit 61, and the glass unit 62 are connected in this order, thereby forming the second reading unit 3. That is, the optical unit 60 and the light source unit 61 are connected together with a screw or the like. The light source unit 61 and the glass unit 62 are connected together with a screw or the like.

According to the above configuration, while leaving the light source unit 61 and the glass unit 62 connected, only the optical unit 60 can be detached. Therefore, it is possible to remove foreign substances, such as dust, mote, residues, and wastes, which get stuck between the optical unit 60 and the light source unit 61. Moreover, it is easy to do maintenance of a plural plurality of the mirrors 24, 25, 26, and 27. Furthermore, while leaving the optical unit 60 and the light source unit 61 connected, only the glass unit 62 can be detached; when foreign substances, such as dust, mote, residues, and wastes, which get stuck between the light source unit 61 and the glass unit 62 are easily removed, it is possible to easily do maintenance.

The optical unit 60 includes a first frame 30, which doubles as an exterior cover of the second reading unit 3 and which is made of resin and is so formed as to have an almost L-shape in cross-section; and a CCD substrate 31, which is so provided as to extend in a document width direction perpendicular to a document conveyance direction and on which the four mirrors 24, 25, 26, and 27, the lens 28, and the CCD 29 are mounted. As shown in FIG. 3, on the inner side of the first frame 30 made of resin, a plurality of mirror mounting sections 30a (only some of which are shown in the diagram) are formed; on the mirror mounting sections 30a, the mirrors 24, 25, 26, and 27 are mounted. The mirrors 24, 25, 26, and 27 are mounted on the mirror mounting sections 30a with U-shaped flat springs 35, which hold both ends of each mirror and the mirror mounting section 30a together.

Figure 4:
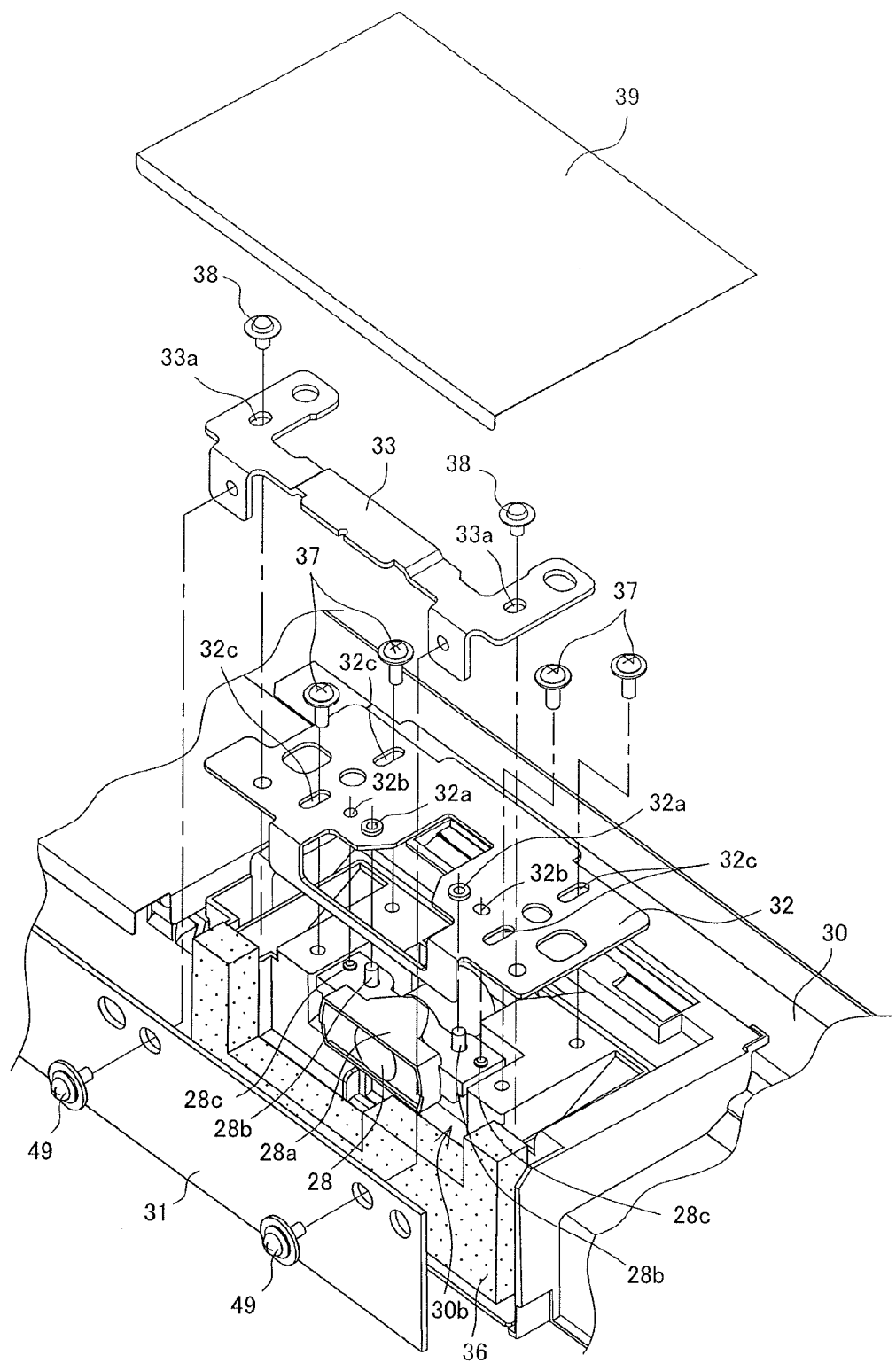
FIG. 4 is an exploded perspective view showing a mounting structure of each component in an optical unit according to the present invention.
Figure 5:
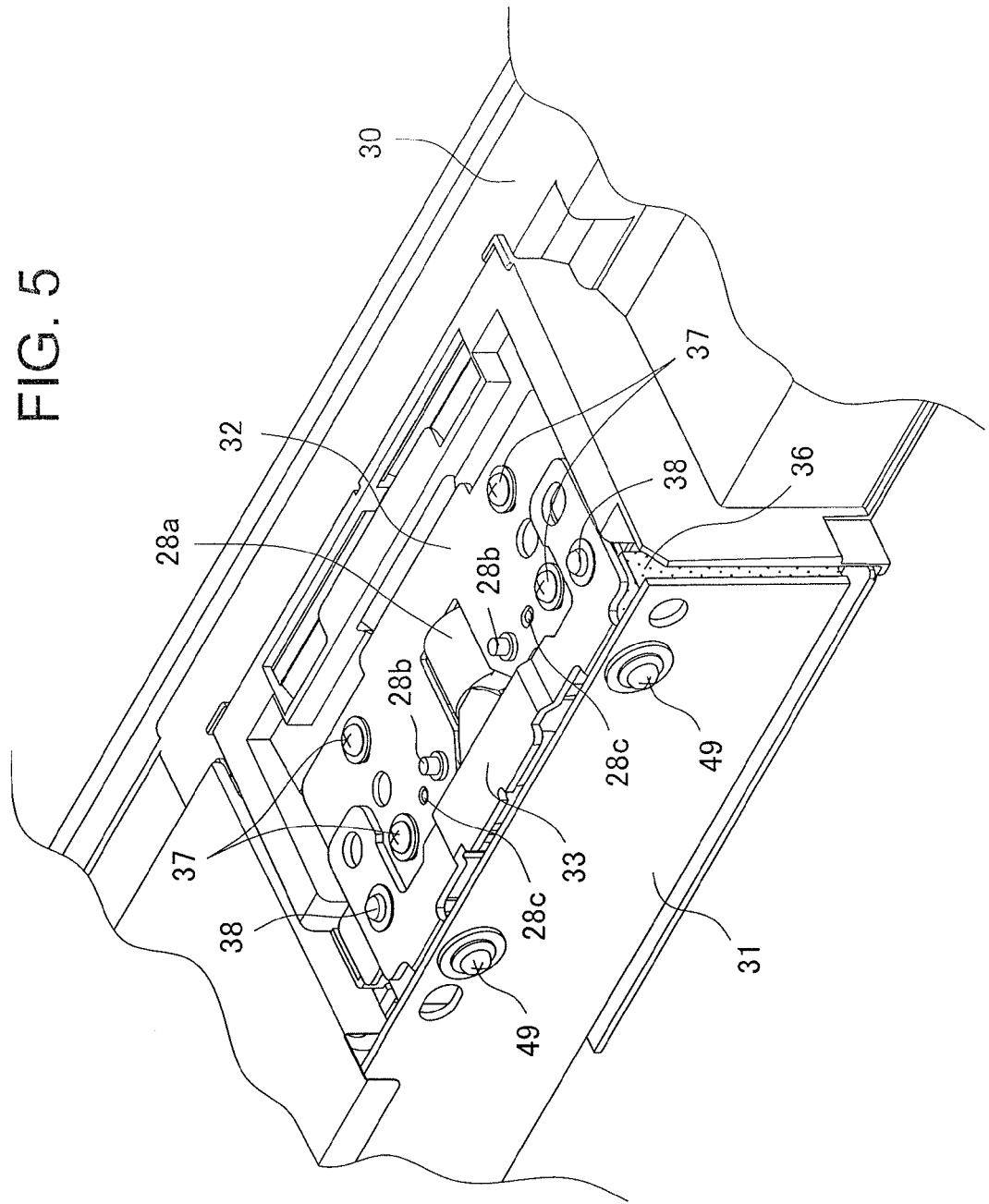
FIG. 5 is a state perspective view showing a mounting state of each component in the optical unit according to the present invention.

FIGS. 4 and 5 are explanatory diagrams illustrating how the CCD substrate 31, on which the lens 28 and the CCD 29 are mounted, is attached in the optical unit 60. FIG. 4 is an exploded perspective view showing each of components that are used to mount the lens 28 and the CCD substrate 31 on the first frame 30. FIG. 5 is a state perspective view showing how the lens 28 and the CCD substrate 31 are mounted.

The lens 28 is held by a lens holder 28a. As shown in FIG. 4, the lens holder 28a is fitted into a concave lens mounting section 30b, which is formed on the outer side of the first frame 30. On the first frame 30, a first metal plate 32 is provided; the lens holder 28a is positioned and held by the first metal plate 32. On the first metal plate 32, through-holes 32a and fitting holes 32b are so provided as to correspond to two pins 28b and two bosses 28c that are provided on the lens holder 28a. The two pins 28b and two bosses 28c that are provided on the lens holder 28a are inserted and fitted into the holes 32a and 32b of the first metal plate 32, and, as shown in FIG. 5, the first metal plate 32 is fixed to the first frame 30 with screws 37. Therefore, the lens holder 28a is positioned and held by the first metal plate 32.

As shown in FIG. 5, the CCD substrate 31 is mounted on a second metal plate 33, and the second metal plate 33 is fixed to the first metal plate 32 with screws 38. Incidentally, screw holes into which the screws 38 of the second metal plate 33 are inserted are formed as long holes 33a. After the screws 38 are loosened, the second metal plate 33 is moved along the long holes 33a to adjust the distance between the CCD 29 and the lens 28. Then, the screws 38 are tightened, and the second metal plate 33 is fixed. Moreover, screw holes into which the screws 37 of the first metal plate 32 are inserted are formed as long holes 32c. After the screws 37 are loosened, the first metal plate 32 is moved with respect to the first frame 30 to adjust the distance between the fourth mirror 37 and the lens 28. Then, the screws 37 are tightened, and the first metal plate 32 is fixed.

In that manner, the lens holder 28a and the CCD substrate 31 are fixed and held by the metal plates. Therefore, the lens holder 28a and the CCD substrate 31 remain unmoved even when the surrounding environment of the optical unit 60 is changed. Moreover, the lens holder 28a and the CCD substrate 31 are mounted on the outer side of the first frame 30, and the first and second metal plates 32 and 33 make it possible to adjust the positions. Therefore, even after the three units 60, 61, and 62 are connected together to form the second reading unit 3, the positions of the lens 28 and the CCD 29 can be adjusted. Furthermore, the first and second metal plates 32 and 33 make it possible to adjust the positions of the lens holder 28a and the CCD substrate 31. Therefore, it is possible to easily make adjustments.

Incidentally, in FIG. 4, the reference numeral 39 represents a black film member, which is mounted in such a way as to cover portions of the first and second metal plates 32 and 33 on the first frame 30. The black film member prevents foreign substances, such as dust, mote, and wastes, from getting into the first frame 30 or the second reading unit 3. The reference numeral 36 represents a sponge member that can elastically deform and which is provided between the CCD substrate 31 and the first frame 30. The sponge member fills the gap between the CCD substrate 31 and the first frame 30, thereby preventing foreign substances, such as dust, mote, and wastes, from getting into the reading unit 3.

The light source unit 61 includes a second frame 40, which is attached to the first frame 30 in such a way as to cover the inside of the first frame 30 on which the mirrors 24, 25, 26, and 27 are mounted; two light guide bodies 22, which are attached on a one surface's side of the second frame 40 and are so provided as to extend in the document width direction perpendicular to the document conveyance direction; chip-like LEDs 21, which are disposed on a one end's side of the document width direction of the light guide bodies 22 and which emit the light entering the light guide bodies 22; a LED substrate 41, on which the LEDs 21 are mounted; and a radiator 43, which releases the heat of the LEDs 21.

Figure 6:
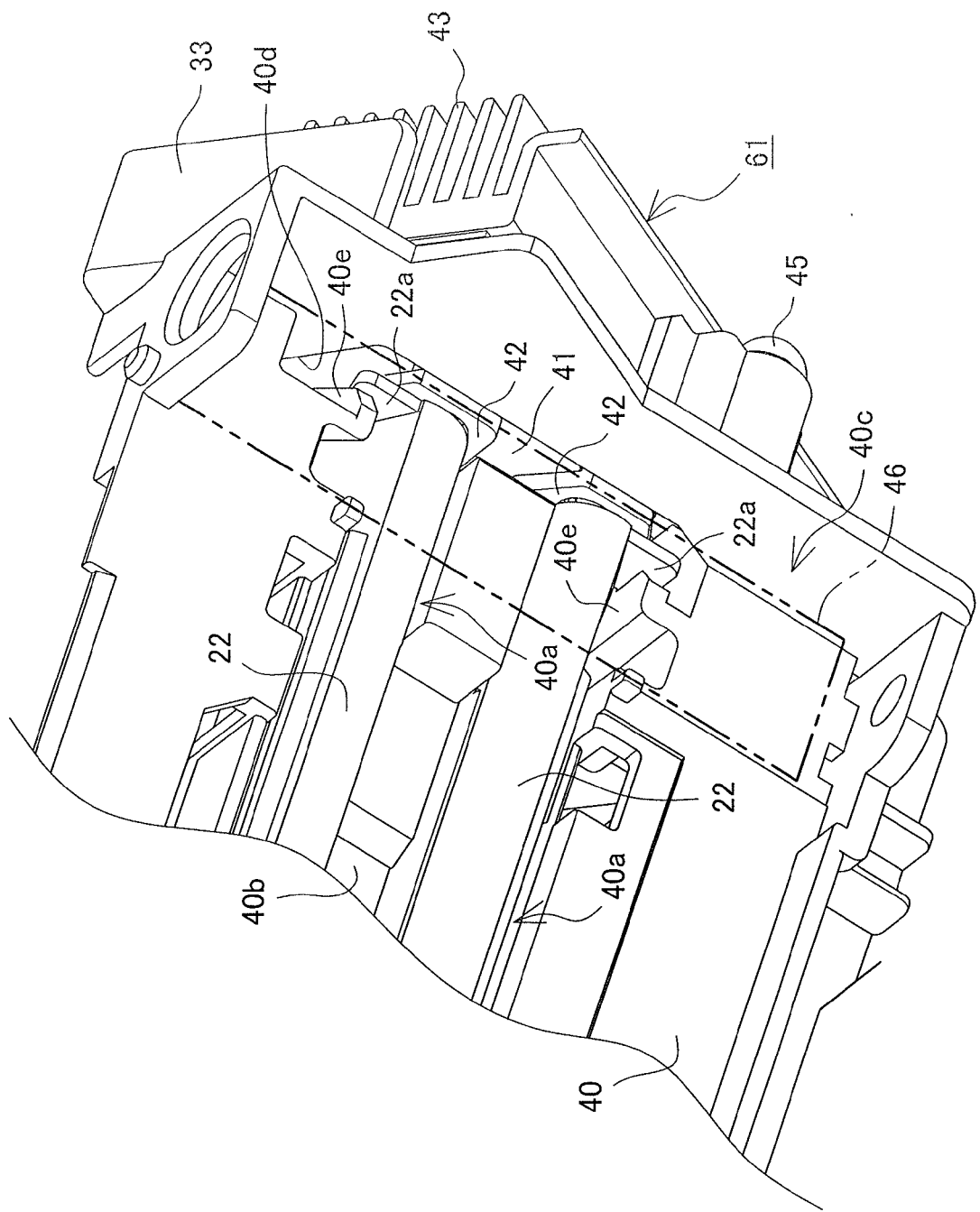
FIG. 6 is an enlarged perspective view showing the configuration of major portions of a light source unit according to the present invention.
Figure 7:
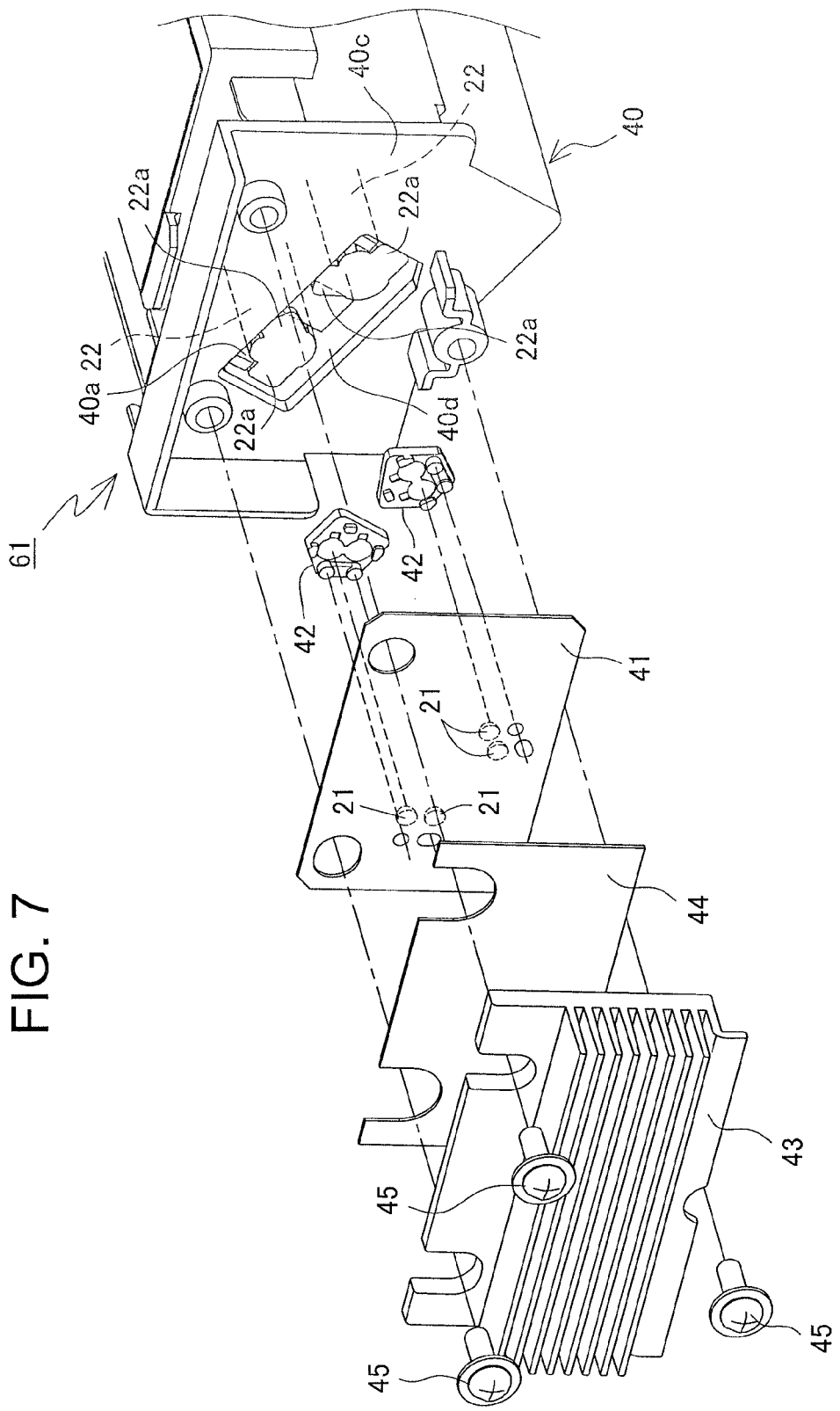
FIG. 7 is an exploded perspective view showing the configuration of major portions of the light source unit according to the present invention.

FIG. 6 is an enlarged perspective view of an end portion of the light source unit 61 where the LEDs are mounted. FIG. 7 is an exploded perspective view showing each component of the light source unit. The second frame 40 is made of resin. As shown in FIGS. 6 and 7, on the second frame 40, concave sections 40a and a slit 40b are formed: in the concave sections 40a, the light guide bodies 22 are mounted; the slit 40b is located between the two light guide bodies 22 mounted in the concave sections 40a, and guides the light reflected from a document to the first mirror 24 in the optical unit 60. In a longitudinal-direction end portion of the second frame 40, a LED substrate mounting section 40c is formed: In the LED substrate mounting section 40c, the LED substrate 41 is mounted. In the LED substrate mounting section 40c, a large opening 40d is formed: Into the opening 40d, the light guide bodies 22 are inserted.

The LED substrate 41 is a metal substrate made from a copper plate, which is excellent in thermal conductivity. The heat generated by semiconductors (such as chip-like LEDs) are released into the substrate. On the LED substrate 41, a reflector 42 is mounted; the reflector 42 is so disposed as to encircle LEDs 21. The reflector 42 is provided between the LED substrate 41 and the one longitudinal-direction side of the light guide body 22, thereby allowing the light emitted from the LEDs 21 to enter the light guide body 22 and keeping the light from leaking to the outside. Incidentally, according to the present embodiment, two LEDs 21 are used for one light guide body 22; the reflector 42 is so disposed as to encircle the two adjoining LEDs 21.

The light guide bodies 22 are made of amorphous acrylic resin, which is high in optical transparency. At two locations on the one longitudinal-direction end side of the light guide body 22, protruding pieces 22a are provided. The protruding pieces 22a of the light guide body 22 pass through the opening 40d of the LED substrate mounting section 40c of the second frame 40 to protrude to an outer side. As shown in FIG. 6, the protruding pieces 22a are held between the reflector 42 and a restricting section 40e of the second frame 40, and the light guide body 22 is thereby kept at a predetermined position. On both end sides of the light guide body 22, a film member 46 is provided in such a way as to prevent the light guide body 22 from coming off the concave section 40a of the second frame 40. The film member 46 is attached to the second frame 40 with two-sided tape or the like, keeping the light guide body 22 in the concave section 40a of the second frame 40.

The radiator 43 lowers the temperatures by releasing the heat of the LEDs 21 and the LED substrate 41. According to the present embodiment, to improve the performance thereof, the radiator 43 is made of aluminum which is good in thermal conductivity; the shape of a fin is employed for the radiator to widen the surface area. Between the LED substrate 41 and the radiator 43, an elastic member 44 that is high in thermal conductivity is provided. Even if the LED substrate 41 and the radiator 43 have slightly-rugged surfaces or any other kind of surfaces, the elastic member 44 deforms to match the shape of both the surfaces. Therefore, the heat of the LED substrate 41 is efficiently transmitted to the radiator 43. According to the present embodiment, the elastic member 44 that is excellent in thermal conductivity is made of an admixture of silicone polymer and ceramics.

Incidentally, the radiator 43 is attached to the second frame 40 with screws 45. Between the radiator 43 and the second frame 40, the LED substrate 41 and the elastic member 44 are sandwiched and held. As a result, the reflectors 42 are in contact with the sides of the light guide bodies 22 and the protruding pieces 22a, and the LEDs 21 are therefore positioned with respect to the light guide bodies 22. To the elastic member 44, an appropriate pressing force is applied to allow the elastic member 44 to deform along the surfaces of the LED substrate 41 and radiator 43.

Figure 8:
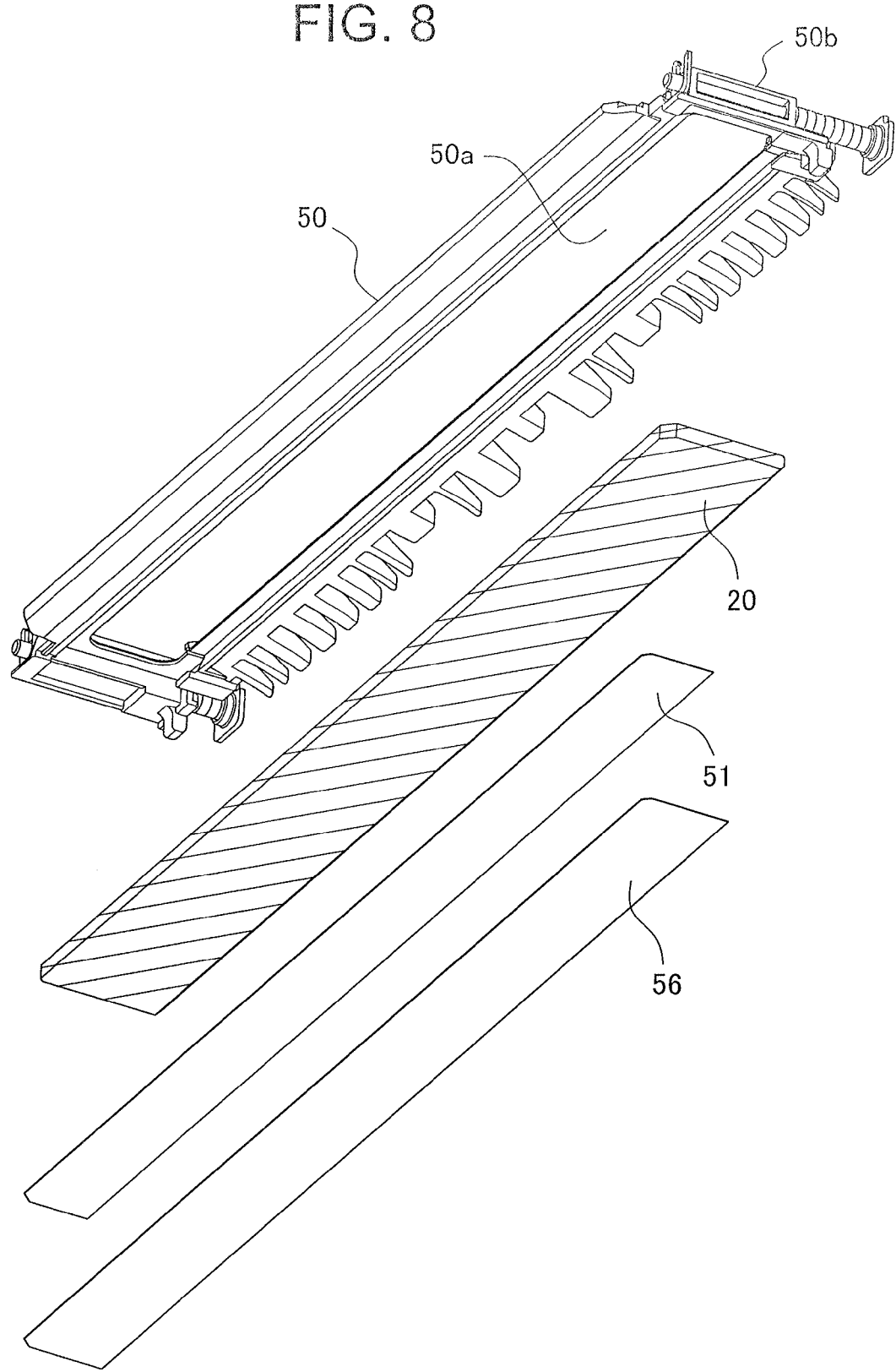
FIG. 8 is an exploded perspective view showing the configuration of a glass unit according to the present invention.

FIG. 8 is an exploded perspective view showing the configuration of the glass unit 62. The glass unit 62 will be described based on FIGS. 1, 2, and 8. The glass unit 62 includes a third frame 50, which is made of resin; and the third contact glass 20, which is mounted in a reading opening 50a formed on the third frame 50.

One surface of the third contact glass 20 is part of the document conveyance path 12. The third contact glass 20 is placed at a reading position X where a document is read. On a document conveyance surface of the third contact glass 20, a sheet-like white plate 51 is mounted to obtain white reference data for shading compensation. The white plate 51 is attached along a longitudinal direction in a portion of a document-conveyance-direction upstream side of the third contact glass 20. According to the present embodiment, a white sheet 56 is so provided as to cover the white plate 51. The white sheet 56 is attached in such a way as to cover almost half of the white plate 51 and third contact glass 20 from an area of the third frame 50 that is behind the document-conveyance-direction upstream side end portion of the third contact glass 20.

The glass unit 62 is so disposed as to cover portions of the light guide bodies 22 of the light source unit 61. The glass unit 62 is so configured as to be able to move back and forth in a short direction of the third contact glass 20, thereby allowing the white plate 51 to move between the reading position X and a retracted position from the reading position X.

Figure 9A:
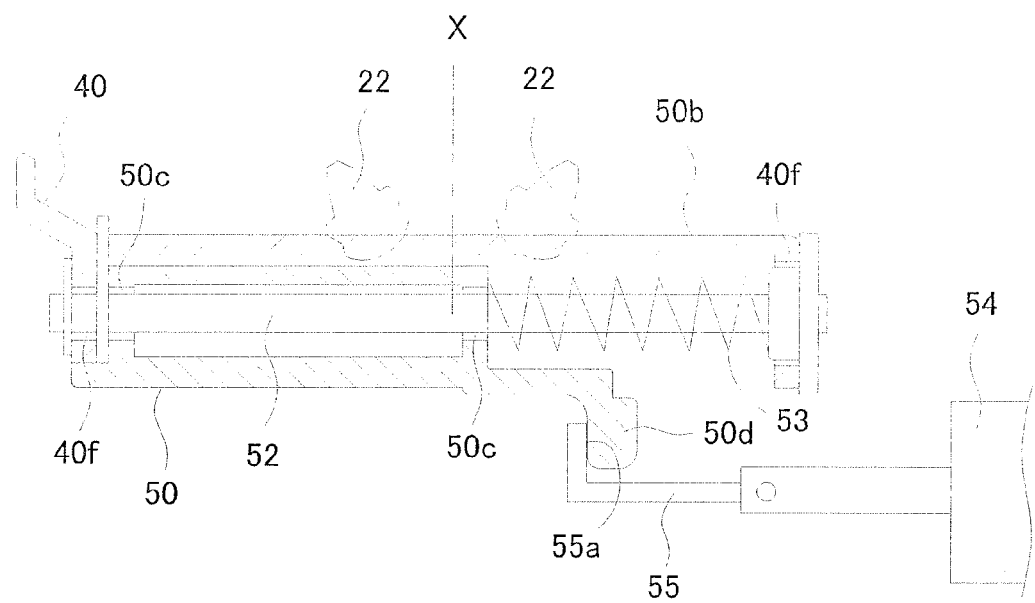
FIGS. 9A and 9B are cross-sectional views showing a connecting structure where the light source unit and the glass unit are connected, according to the present invention.
Figure 9B:
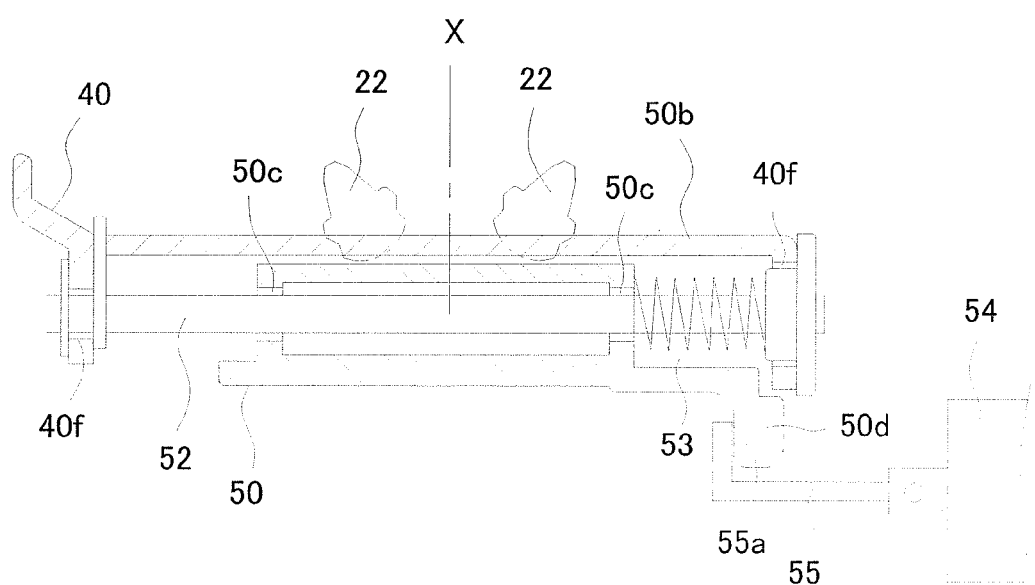

FIGS. 9A and 9B are cross-sectional views showing a connecting structure where the glass unit 62 and the light source unit 61 are connected. In both longitudinal-direction side portions of the third frame 50, as shown in FIG. 8, mounting sections 50b are formed to mount the glass unit 62 on the light source unit 61. In the mounting sections 50b, as shown in FIGS. 9A and 9B, a through-hole 50c is formed. In the second frame 40 of the light source unit 61, a through-hole 40f is formed. Into the through-hole 40f of the second frame 40 and the through-hole 50c of the third frame 50, a cylindrical support member 52 is inserted. E-shaped retaining rings are fitted onto both ends of the support member 52. In this manner, the glass unit 62 is connected to the light source unit 61.

Here, the structure for moving the glass unit 62 will be described. In the light source unit 61, a compression spring 53 is provided to press the glass unit 62 in one direction. On a side plate (not shown) of the document conveyance device A, a solenoid 54 and a link member 55 are provided to move the glass unit 62 in the other direction. The compression spring 53 is mounted between the through-hole 40f of the second frame 40 in the support member 52 and the through-hole 50c of the third frame 50. A pressing force of the compression spring 53 moves the glass unit 62 to a position on the document-conveyance-direction upstream side shown in FIG. 9A. An attraction operation of the solenoid 54 moves the link member 55 which is attached to a plunger. A contact section 55a of the link member 55 comes in contact with a protruding section 50d of the third frame 50, thereby moving, against the pressing force of the compression spring 53, the glass unit 62 to a position on the document-conveyance-direction downstream side shown in FIG. 9B.

Figure 10A:
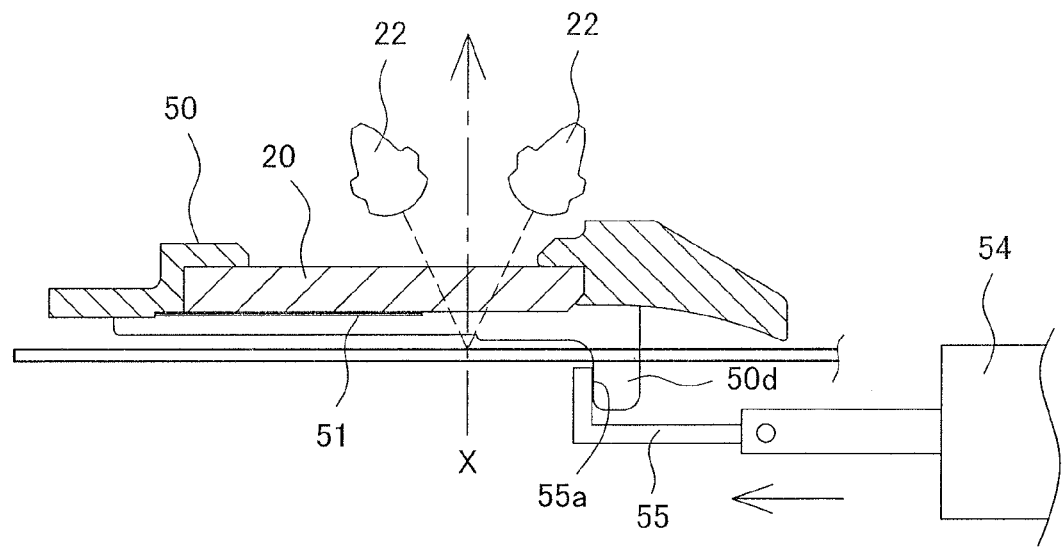
FIGS. 10A and 10B are schematic diagrams showing a moving state of the glass unit of the present invention.
Figure 10B:
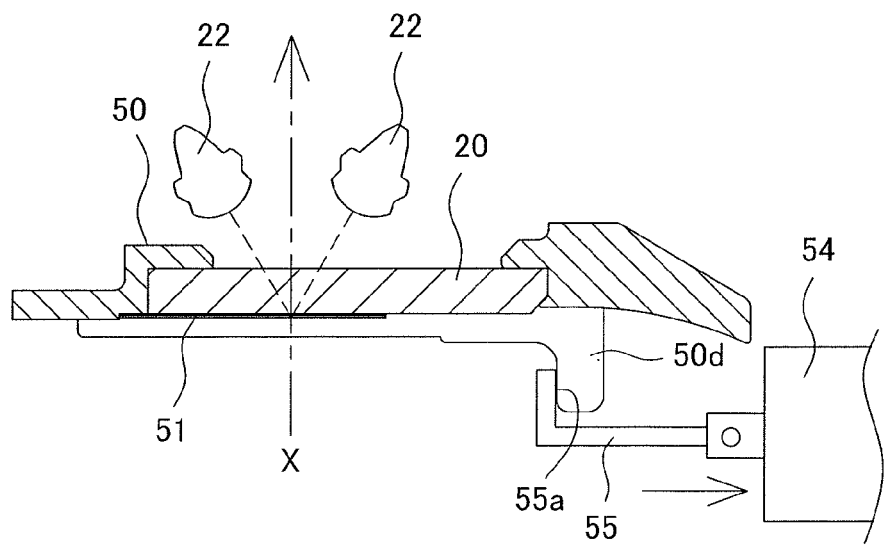

FIGS. 10A and 10B are schematic diagrams showing the relationship between the third contact glass 20 and the reading position when the glass unit 62 is moved. Based on FIGS. 10A and 10B, the above-described moving structure will be detailed. In an initial state (when the solenoid 54 is OFF), a pressing force of the compression spring 53 presses the glass unit 62 in a direction indicated by solid-line arrow as shown in FIG. 10A; an end section of the mounting section 50b is stopped after coming in contact with a portion where the through-hole 40f of the second frame 40 is formed. At this time, the white plate 51 is at the retracted position from the reading position X.

In this state or in the case where the white plate 51 at the retracted position is to be moved to the reading position X, the solenoid 54 is turned ON (electric conduction). After the solenoid 54 is turned ON, the plunger is attracted, and the link member 55 therefore moves in a direction indicated by arrow as shown in FIG. 10B. As a result, the contact section 55a that is formed at the tip side of the link member 55 comes in contact with the protruding section 50d of the third frame 50; the link member 55 moves, against the pressing force of the compression spring 53, the glass unit 62 in a direction indicated by arrow in the diagram. After the attraction operation of the solenoid 54, the glass unit 62 is stopped. Therefore, the white plate 51 moves from the retracted position to the reading position X.

When the white plate 51 is to be moved again to the retracted position from the reading position X, the solenoid 54 is turned OFF (no electric conduction). As a result, the attracting of the plunger is cancelled, and the plunger and the link member 55 become free. A pressing force of the compression spring 53 presses and moves the glass unit 62 in a direction indicated by solid-line arrow as shown in FIG. 10A. The movement forces the white plate 51 to move to the retracted position.

Figure 11:
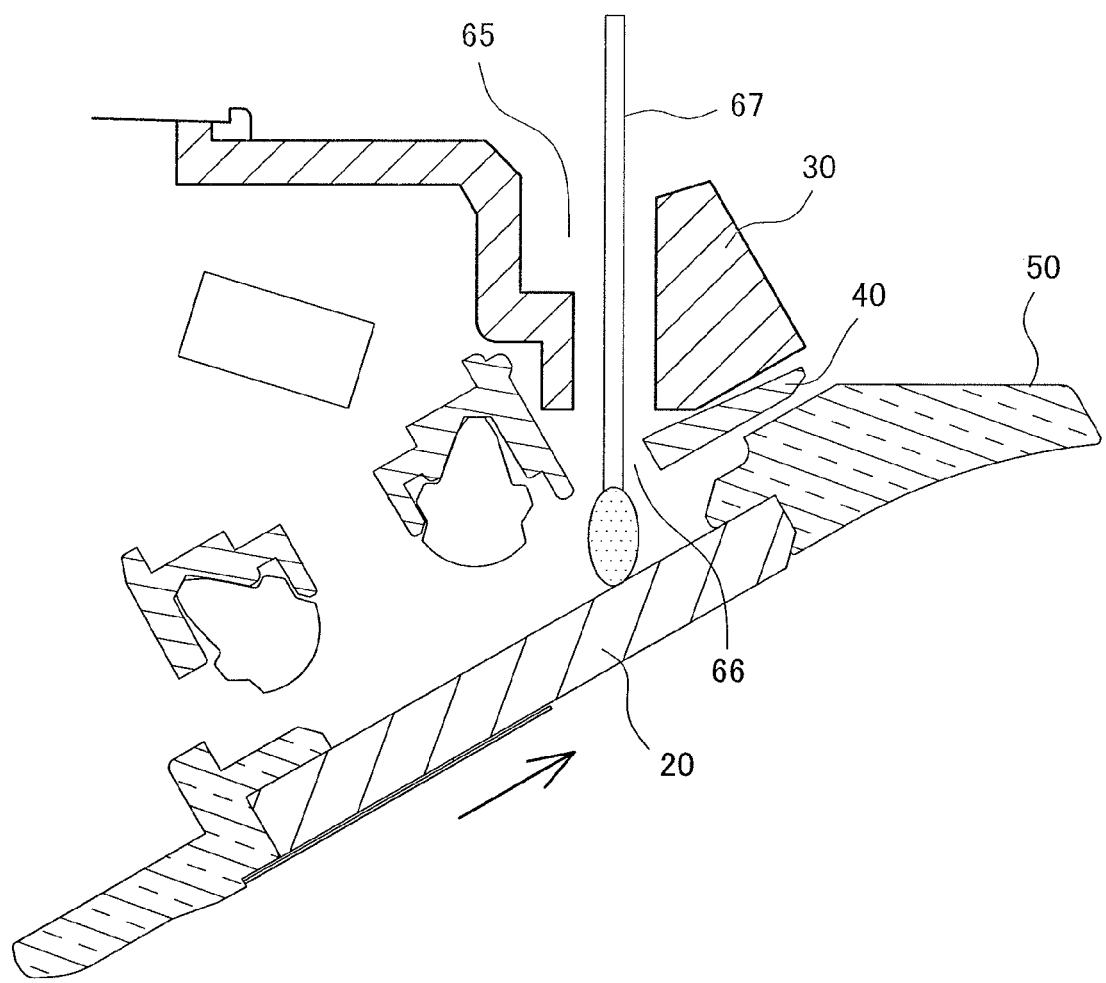
FIG. 11 is a schematic diagram showing a cleaning state of a third contact glass according to the present invention.

Then, as shown in FIG. 11, on the first frame 30 and the second frame 40, cleaning openings 65 and 66 are respectively provided to enable a cleaning of a third contact glass 30's back surface that is opposite to the document conveyance surface. The cleaning opening 65 of the first frame 30 is formed in a document-conveyance-direction end portion and along a longitudinal direction of the first frame 30. The cleaning opening 65 is usually closed by a film member to prevent foreign substances from entering. Only when the cleaning is carried out, the film member is removed. The cleaning opening 66 of the second frame 40 is formed along a longitudinal direction of the second frame 40 and at a position corresponding to the cleaning opening 65 of the first frame 30, i.e. at the same position of the cleaning opening 65 of the first frame 30 in the document conveyance direction.

As shown in FIG. 11, the cleaning opening 65 of the first frame 30, and the cleaning opening 66 of the second frame 40 go through to the back surface of the third contact glass 20 of the third frame 50. A cleaning member 67, such as a cotton swab, is inserted into the cleaning openings 65 and 66 to clean the back surface of the third contact glass 20. At this time, before the cleaning, the glass unit 62 is moved until the back surface of the third contact glass 20 can be seen through the cleaning openings 65 and 66.

Accordingly, even if foreign substances, such as dust, mote, and residues, get stuck between the glass unit 62 and the light source unit 61, the foreign substances adhering to the back surface of the third contact glass 20 can be easily removed. Incidentally, if the foreign substances cannot be easily removed by the cleaning member such as a cotton swab through the cleaning openings 65 and 66, or if the foreign substances adhering to the back surface cannot be easily found, the glass unit 62 is detached from the light source unit 61 as described above while the optical unit 60 and the light source unit 61 remain connected together, and a cleaning fluid or the like is used to clean.

Based on FIGS. 1 and 2, an optical path of the second reading unit 3 will be described. The light emitted from the LEDs 21 enters through end surfaces of the light guide bodies 22, which are made of transparent resin. Then, the light travels along the longitudinal direction of the light guide bodies 22 while being reflected between reflection planes inside the light guide bodies 22; part of the light goes out through emission surfaces that extend in the longitudinal direction of the light guide bodies 22. The emitted light is directed at a document conveyed along the document conveyance path 12 via the third contact glass 20.

The light that has struck the document is reflected from the surface of the document as shown in FIG. 2, before being guided into the second reading unit 3 via the third contact glass 20. The light that has entered the second reading unit 3 goes through the slit 40b of the second frame 40 and is reflected by the first mirror 24. Then, the light is reflected by the second mirror 25, and then by the third mirror 26. The light reflected by the third mirror 26 is reflected again by the second mirror 25, and then enters the last, fourth mirror 27. Then, the light reflected by the fourth mirror 27 is concentrated by the lens 28. The concentrated light forms an image on the CCD 29. In this manner, the image on the document is read. Incidentally, the second mirror 25 includes a first reflective surface 25a, which reflects the light from the first mirror 24 to the third mirror 26; and a second reflective surface 25*b*, which reflects the light from the third mirror 26 to the fourth mirror 27.

In this case, as shown in FIG. 1, the above-described U-shaped document conveyance path 12's upstream-side route which extends to the pair of resistance rollers 16 from a paper feed opening 12*a* through which a document on the paper feed tray 10 is supplied is formed substantially linearly. The document conveyance path 12's route which extends from the pair of resistance rollers 16 to the first contact glass 1*a* is formed in a curved shape. The document conveyance path 12's downstream-side route which extends from the first contact glass 1*a* to a paper discharge opening 12*b* where the pair of paper discharge rollers 19 is located is so formed as to be inclined upward toward the paper feed opening's side. The second reading unit 3 is disposed in an area on the inner side of the U-shaped document conveyance path 12. The area (space) on the inner side of the U-shaped document conveyance path 12, in which the second reading unit 3 is disposed, becomes gradually narrower toward the paper discharge tray 11.

The contour of the outer shape of the second reading unit 3 looks like a rectangular shape one corner portion of which has been cut. As shown in FIG. 1, the outer shape of the entire reading unit 3 is made up of a first surface 3*a*, which is below the linear path extending from the supply roller 13 to the pair of resistance rollers 16; a second surface 3*b*, which is on the curved side of the U-shaped path; and a third surface 3*c*, which is above the first contact glass 1*a*; a fourth surface 3*d*, which is inclined along the path extending from the pair of second conveyance rollers 18 to the pair of paper discharge rollers 19 and which corresponds to a portion from which the above one corner portion has been cut; and a fifth surface 3*e*, which is on a paper discharge tray 11's side and faces the second surface 3*b*. That is, according to the present embodiment, the outer shape of the second reading unit is formed along the document conveyance path 12. The height-direction size of the second reading unit becomes gradually smaller toward the paper discharge tray 11. In this manner, the device is made smaller in size as a whole.

In a one-end-side portion of the second reading unit 3, the reading position X is provided to read a document. That is, in an end portion of the second reading unit 3 on the fifth surface 3*e*'s side (or on the paper discharge tray 11's side), the third contact glass 20, the two light guide bodies 22, and the first mirror 24 are disposed. The CCD substrate 31 on which the second, third, and fourth mirrors 25, 26, and 27, the lens 28, and the CCD 29 are mounted is placed closer to the second surface 3*b*'s side (or the opposite side from the paper discharge tray 11) than the first mirror 24. That is, in the second reading unit 3, the light reflected from a document is taken in through a narrow-space portion on the fifth surface 3*e*'s side in the unit 3, and the light that has been taken in is reflected a plurality of times in a wider space, thereby ensuring the length of an optical path.

More specifically, the first mirror 24 is placed on the closest side to the fifth surface 3*e* and adjacent to the slit 40*b* of the second frame 40 in such a way as to immediately reflect the light passing through the slit 40*b* toward between the third mirror 26 and the fourth mirror 27. The second mirror 25 is placed below a reflective surface 24*a* of the first mirror 24 and in a wider space on the second surface 3*b*'s side; the second mirror 25 reflects the light reflected from the first mirror 24 to the second mirror 25. The third mirror 26 is placed below the reflective surface 24*a* of the first mirror 24 and in a space adjacent to a side portion of the outer side of the concave sections 40*a* of the second frame 40, which are formed to hold the light guide bodies 22; the third mirror 26 reflects the light reflected from the second mirror 25 to the second mirror 25 again. The fourth mirror 27 is placed above the reflective surface 24*a* of the first mirror 24 and adjacent to the first mirror 24; the fourth mirror 27 reflects the light reflected from the second mirror 25 to the lens 28. The lens 28 is placed above the first mirror 24 and in a wider space on the second surface 3*b*'s side and right above the second mirror 25. The CCD substrate 31 is placed at the closest position to the second surface 3*b* and along the second surface 3*b*. In this manner, the optical components are laid out in an optimal way so that the light entering through the one narrow-space end portion is reflected a plurality of times in the wider space; the second reading unit 3 is therefore smaller in size, and, at the same time, a predetermined length of the optical path is ensured.

In the above-described configuration of the second reading unit 3, the outer shape of the second reading unit 3 is so formed as to become narrower in the height-direction length toward the paper discharge tray 11 to match the shape of the U-shaped document conveyance path 12. As a result, the device can be made smaller in size as a whole.

Moreover, in the narrow-space portion of the one end side of the second reading unit 3, the reading position X is provided to read a document. The optical components are laid out in such a way that the light entering through the one narrow-space end portion is reflected a plurality of times in the wider space. Therefore, the second reading unit 3 is smaller in size, and, at the same time, a predetermined length of the optical path is ensured.

Large components, the lens 28, the photoelectric conversion element 29, and the CCD substrate 31, are disposed in the wide space in the second reading unit 3. On the second mirror 25, two reflective surfaces are provided; the second mirror 25 is then placed in the wide space of the second reading unit 3. In this manner, the optical components are laid out in such a way as to reduce as much wasted space as possible. As a result, the second reading unit 3 is smaller in size.

The third mirror 26 is placed in a space adjacent to the side portion of the outer side of the concave sections 40*a* of the second frame 40, which are formed to hold the light guide bodies 22. Therefore, in the concave sections 40*a* of the second frame 40, the emitted light that is reflected by the first mirror 24 does not enter the back surface of the third mirror 26. Thus, the emitted light of the first mirror 24 is not reflected by the back surface of the third mirror 26, and does not enter the reading optical path as stray light.

Moreover, the fourth mirror 27 is placed adjacent to and above the reflective surface of the first mirror 24, thereby keeping the emitted light reflected by the first mirror 24 from entering the back surface of the fourth mirror 27 or directly entering the lens 28.

Furthermore, according to the present embodiment, the second reading unit 3 is made by connecting the optical unit 60, the light source unit 61, and the glass unit 62 in this order. Even when the light source unit 61 and the glass unit 62 remain connected together, the optical unit 60 can be detached. Even when the optical unit 60 and the light source unit 61 remain connected together, the glass unit 62 can be detached. Therefore, it is possible to easily remove foreign substances stuck between the optical unit 60, the light source unit 61, and the glass unit 62. Moreover, it is easy to do maintenance of components disposed between the units. In particular, paper powder and residues from rollers emerge around the third contact glass 20, which doubles as the document conveyance surface. Therefore, if there are paper powder or residues adhering to the inner side of the third contact glass 20, the glass unit 62 can be detached from the light source unit 61, and the third contact glass 20 can be easily cleaned.

EXPLANATION OF REFERENCE SYMBOLS

A: Document conveyance device A
H: Document reader main body
1a: First contact glass
2: First reading unit
3: Second reading unit (reading unit)
12: Document conveyance path
20: Third contact glass
21: LED
22: Light guide body
24: First mirror
25: Second mirror
26: Third mirror
27: Fourth mirror
28: Lens
29: CCD (photoelectric conversion element)
60: Optical unit (third unit)
61: Light source unit (second unit)
62: Glass unit (first unit)

The invention claimed is:

1. A document reader, comprising:
a paper feed tray on which a document is placed; a paper discharge tray that is disposed below the paper feed tray; a U-shaped conveyance path that guides a document fed from the paper feed tray to the paper discharge tray; a conveyance mechanism that conveys a document along the conveyance path; and reading means for reading a document passing over a predetermine reading position of the conveyance path, wherein the reading means includes a reading unit having a contact glass which includes the reading position, a light source which emits light to a document via a surface of the contact glass, a first mirror which reflects the light reflected from the document, a plurality of mirrors which reflects the light reflected by the first mirror a plurality of times, a lens that converges the light that is reflected a plurality of times by the plurality of mirrors, and a photoelectric conversion element which carries out photoelectric conversion of the light converged by the lens, the reading unit is placed on an inner side of the U-shaped conveyance path, and becomes shorter in height-direction length toward the paper discharge tray, in an end portion of the reading unit that is short in height-direction length on a side of the paper discharge tray, the contact glass, the light source, and the first mirror are placed, and on a side that is further away from the paper discharge tray than the first mirror in the reading unit, the plurality of mirrors, the lens, and the photoelectric conversion element are placed, and the plurality of mirrors at least includes a second mirror that reflects the light reflected from the first mirror, a third mirror that reflects the light reflected from the second mirror, and a fourth mirror that reflects, to the lens, the light that is reflected a plurality of times; and the second and third mirrors are placed below a reflective surface of the first mirror, and the fourth mirror and the lens are placed above the reflective surface of the first mirror.

2. The document reader according to claim 1, wherein the light source includes a semiconductor element that emits the light, and a rod-shaped light guide body that is so provided as to extend in a document width direction and emits the light of the semiconductor element to a surface of a document.

3. The document reader according to claim 1, wherein the reading unit includes a frame having a concave section for holding the light source, and a slit for guiding the light reflected from a document to a bottom surface of the concave section; the first mirror is disposed adjacent to an exit of the slit for the light reflected from a document; and the third mirror is disposed in a space adjacent to an side portion of a back surface side of the concave section of the frame.

4. The document reader according to claim 1, wherein the first mirror is disposed on a side of a back surface of the fourth mirror and adjacent to the fourth mirror.

5. The document reader according to claim 1, wherein the second mirror includes a first reflective surface which reflects the light reflected from the first mirror to the third mirror, and a second reflective surface which reflects the light reflected from the third mirror to the fourth mirror.

6. The document reader according to claim 1, wherein on a downstream side of the U-shaped conveyance path, a path that is inclined upward is formed; and the reading unit becomes gradually shorter in height-direction length along the inclined path on the downstream side of the conveyance path.

7. The document reader according to claim 1, wherein the U-shaped conveyance path is formed in such a way that a space on the inner side of the U-shape becomes narrower toward the paper discharge tray.

8. A document reader comprising:
a paper feed tray on which a document is placed; a paper discharge tray that is disposed below the paper feed tray; a U-shaped conveyance path that guides a document fed from the paper feed tray to the paper discharge tray; a conveyance mechanism that conveys a document along the conveyance path; and reading means for reading a document passing over a predetermine reading position of the conveyance path, wherein the reading means includes a reading unit having a contact glass which includes the reading position, a light source which emits light to a document via a surface of the contact glass, a first mirror which reflects the light reflected from the document, a plurality of mirrors which reflect the light reflected by the first mirror a plurality of times, a lens that converges the light that is reflected a plurality of times by the plurality of mirrors, and a photoelectric conversion element which carries out photoelectric conversion of the light converged by the lens, the reading unit is placed on an inner side of the U-shaped conveyance path, and becomes shorter in height-direction length toward the paper discharge tray, in an end portion of the reading unit that is short in height-direction length on a side of the paper discharge tray, the contact glass, the light source, and the first mirror are placed, and on a side that is further away from the paper discharge tray than the first mirror in the reading unit, the plurality of mirrors, the lens, and the photoelectric conversion element are placed, the reading unit is made by connecting together a first unit having the contact glass, a second unit having the light source, and a third unit having the first mirror, the plurality of mirrors, the lens, and the photoelectric conversion element, the light source includes a semiconductor element that emits the light, and a light guide body that is so provided as to extend in a document width direction and emits the light of the semiconductor element to a surface of a document, and the second unit includes a substrate on which the semiconductor element is mounted, and a radiator that reduces heat generated by the semiconductor element.

9. The document reader according to claim 8, wherein the reading unit is made by connecting the first and third units to the second unit.

10. The document reader according to claim 8, wherein the reading unit that includes the first, second, and third units is mounted on the conveyance mechanism in a detachable manner; and, in the reading unit detached from the conveyance mechanism, the first unit is detachable when the second and third units remain connected.

11. The document reader according to claim 8, wherein the second unit includes a resin frame where a concave section in which the light guide body is mounted, and a slit that guides the light reflected from a document to a mirror of the third unit are formed on a one surface side thereof, and a mounting section in which the substrate is mounted is formed on a side surface side thereof.

12. The document reader according to claim 11, wherein the third unit include a resin frame where a mirror mounting section in which a plurality of mirrors is mounted is formed on a one surface side thereof, and a lens mounting section in which the lens is mounted is formed on the other surface side.

13. The document reader according to claim 12, wherein the first unit is connected to the second unit in such a way as to be able to move in a document conveyance direction.

14. The document reader according to claim 13, wherein an opening extending from outside of the reading unit to a back surface side of the contact glass of the first unit that is opposite to a document conveyance surface is provided in the third and second units.

15. The document reader according to claim 13, wherein the first unit includes a white sheet to obtain shading compensation data, and the white sheet is attached in such a way as to cover one document-conveyance-direction portion of the contact glass.

16. The document reader according to claim 8, wherein the third unit is detachable from the second unit when the first and second units remain connected.

* * * * *